United States Patent
Gao et al.

(10) Patent No.: US 8,306,107 B2
(45) Date of Patent: Nov. 6, 2012

(54) SYNTAX ELEMENTS TO SVC TO SUPPORT COLOR BIT DEPTH SCALABILITY

(75) Inventors: Yong Ying Gao, Beijing (CN); Yu Wen Wu, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 825 days.

(21) Appl. No.: 12/311,922

(22) PCT Filed: Oct. 25, 2006

(86) PCT No.: PCT/CN2006/002848
§ 371 (c)(1),
(2), (4) Date: Apr. 17, 2009

(87) PCT Pub. No.: WO2008/049271
PCT Pub. Date: May 2, 2008

(65) Prior Publication Data
US 2009/0323804 A1    Dec. 31, 2009

(51) Int. Cl.
H04N 7/12    (2006.01)
H04N 11/02   (2006.01)
(52) U.S. Cl. .................... 375/240.02; 375/240.23
(58) Field of Classification Search ............. 375/240.02, 375/240.23
See application file for complete search history.

(56) References Cited

U.S. PATENT DOCUMENTS

2004/0228535 A1 * 11/2004 Honda et al. ............. 382/233
2005/0259729 A1    11/2005 Sun
2006/0233235 A1 * 10/2006 Ryu et al. ............. 375/240.1

FOREIGN PATENT DOCUMENTS

WO    WO 03/036980    5/2003

OTHER PUBLICATIONS

Search Report Dated Jul. 19, 2007.

* cited by examiner

Primary Examiner — Jay Patel
Assistant Examiner — Richard Torrente
(74) Attorney, Agent, or Firm — Myers Wolin, LLC

(57) ABSTRACT

This invention presents a scalable solution to encode the whole 12-bit raw video once to generate one bitstream that contains an H.264/AVC compatible base layer and a scalable enhancement layer. If an H.264/AVC decoder is available at the client end, only the base layer sub-bitstream is decoded and the decoded 8-bit video can be viewed on a conventional 8-bit display device; if the color bit depth scalable decoder is available at the client end, both the base layer and the enhancement layer sub-bitstreams will be decoded to obtain the 12-bit video and it can be viewed on a high quality display device that supports more than eight bit.

5 Claims, 1 Drawing Sheet

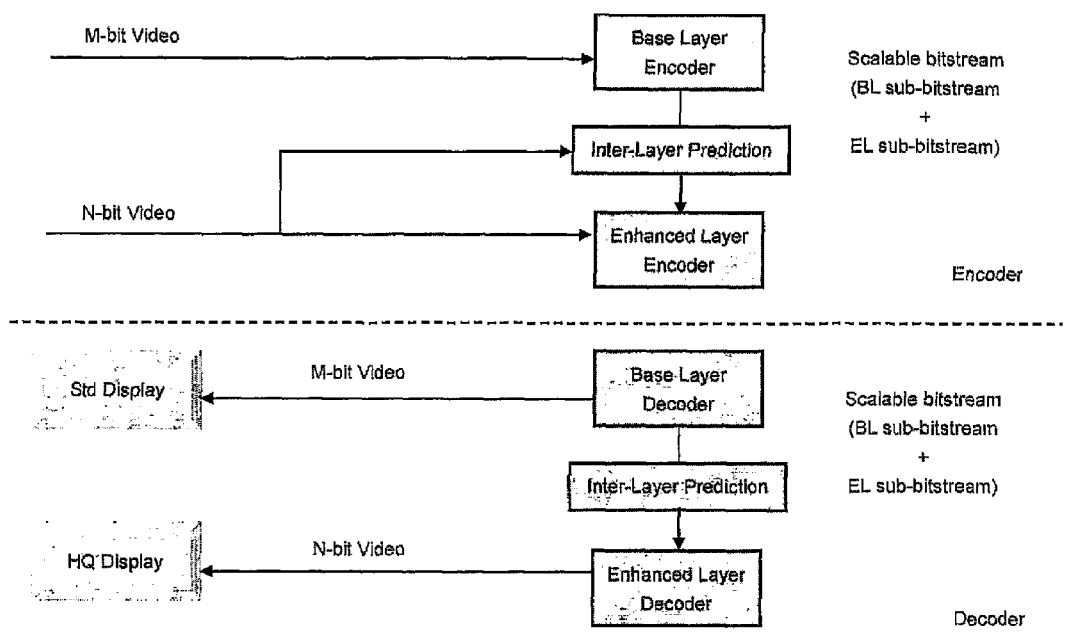

SYNTAX ELEMENTS TO SVC TO SUPPORT COLOR BIT DEPTH SCALABILITY

This application claims the benefit, under 35 U.S.C. §365 of International Application PCT/CN2006/002848, filed Oct. 25, 2006, which was published in accordance with PCT Article 21(2) on May 2, 2008 in English.

FIELD OF THIS INVENTION

This invention relates to the technical field of digital video coding. It presents a technical solution for a novel type of scalability: color bit depth scalability. Two new syntax elements are presented to be added to SVC.

BACKGROUND OF THE INVENTION

In recent years, higher bit color depth rather than the conventional eight bit color depth is more and more desirable in many fields, such as scientific imaging, digital cinema, high-quality-video-enabled computer games, and professional studio and home theatre related applications. Accordingly, the state-of-the-art video coding standard—H.264/AVC—has already included Fidelity Range Extensions, which support up to 14 bits per sample and up to 4:4:4 chroma sampling.

However, none of the existing high bit coding solutions supports color bit depth scalability. Assume that we have a scenario with 2 different decoders (or clients with different requests for the color bit depth, e.g. 12 bit) for the same raw video. The existing H.264/AVC solution is to encoder the 12-bit raw video to generate bitstream no. 1 and then convert the 12-bit raw video to an 8-bit raw video and encode the 8-bit counterpart to generate bitstream no. 2. If we want to deliver the video to different clients that request different bit depths, we have to deliver it twice, or put the 2 bitstreams in one disk together. It is of low efficiency regarding both the compression ratio and the operational complexity.

SUMMARY OF THE INVENTION

This invention presents a scalable solution to encode the whole 12-bit raw video once to generate one bitstream that contains an H.264/AVC compatible base layer and a scalable enhancement layer. If an H.264/AVC decoder is available at the client end, only the base layer sub-bitstream is decoded and the decoded 8-bit video can be viewed on a conventional 8-bit display device; if the color bit depth scalable decoder is available at the client end, both the base layer and the enhancement layer sub-bitstreams will be decoded to obtain the 12-bit video and it can be viewed on a high quality display device that supports more than eight bit.

BRIEF DESCRIPTION OF THE DRAWINGS

FIG. 1 illustrates a framework of color bit depth scalable coding

DETAILED DESCRIPTION OF THE PREFERRED EMBODIMENT

The framework of the presented color bit depth scalable coding is shown in FIG. 1. In FIG. 1, two videos will be used as an input to the video codec: N-bit raw video and M-bit (usually 8-bit) video (N>M). The M-bit video can be either converted from the N-bit raw video or given by other ways.

The M-bit video is encoded as the base layer using the inside H.264/AVC encoder. The N-bit video is encoded as the enhancement layer using the scalable encoder. The coding efficiency of the enhancement layer can be significantly improved by utilizing the information of the base layer. We call the utilization of the base layer information in encoding the enhancement layer inter-layer prediction. Each picture—a group of Macroblocks (MBs)—will have two access units, one for the base layer and the other one for the enhancement layer. The coded bitstreams will be multiplexed to form a scalable bitstream.

During the decoding process, base layer decoder will use only the base layer sub-bitstream which is extracted from the whole bitstream, to provide a M-bit reconstructed video. By decoding the whole bitstream, N-bit video can be reconstructed.

In this part, we present the technical solution to color bit depth scalability. Two new syntax elements are added to SVC SPS in SVC extension (seq_parameter_set_svc_extension( )) to support color bit depth scalability: bit_depth_scalability_flag and bit_depth_pred_idc, as highlighted.

| | C | Descriptor |
|---|---|---|
| seq_parameter_set_svc_extension( ) { | | |
|   extended_spatial_scalability | 0 | u(2) |
|   if ( chroma_format_idc > 0 ) { | | |
|     chroma_phase_x_plus1 | 0 | u(2) |
|     chroma_phase_y_plus1 | 0 | u(2) |
|   } | | |
|   if( extended_spatial_scalability == 1 ) | | |
|   { | | |
|     scaled_base_left_offset | 0 | se(v) |
|     scaled_base_top_offset | 0 | se(v) |
|     scaled_base_right_offset | 0 | se(v) |
|     scaled_base_bottom_offset | 0 | se(v) |
|   } | | |
|   bit_depth_scalability_flag | 0 | u(1) |
|   if ( bit_depth_scalability_flag ) { | | |
|     bit_depth_pred_idc | 0 | ue(v) |
|   } | | |
|   fgs_coding_mode | 2 | u(1) |
|   if( fgs_coding_mode == 0 ) { | | |
|     groupingSizeMinus1 | 2 | ue(v) |
|   } else { | | |
|     numPosVector = 0 | | |
|     do { | | |
|       if( numPosVector == 0 ) { | | |
|         scanIndex0 | 2 | ue(v) |
|       } | | |
|       else { | | |
|         deltaScanIndexMinus1[numPosVector] | 2 | ue(v) |
|       } | | |
|       numPosVector ++ | | |
|     } | | |
|   while( scanPosVectLuma[ numPosVector − 1 ] < 15 ) | | |
|     } | | |
| } | | | bit_depth_scalability_flag equal to 1 specifies that process of color bit depth prediction shall be invoked in the inter-layer prediction. Otherwise (equal to 0) specified that no process of color bit depth prediction shall be invoked (default).

bit_depth_pred_idc equal to 0 specifies that the operation of bit-shift is utilized as the color bit depth inter-layer prediction (default). Otherwise is reserved for advanced color bit depth prediction.

The invention claimed is:
1. A method for encoding video data in a bit depth scalable manner, wherein an enhancement layer video is predicted from a reconstructed base layer video, and wherein at least a first and a different second indication are added to the data to define the process of bit depth scalability, wherein
- if the first indication has a first value, no bit depth inter-layer prediction is utilized;
- if the first indication has a second value, it specifies that bit depth inter-layer prediction is utilized, wherein the type of inter-layer prediction depends on the value of the second indication, wherein
- if the second indication has a first value, inter-layer prediction based on bit-shift is used; and
- if the second indication has another than the first value, an advanced bit depth prediction is utilized, wherein two new syntax elements are added:
- a first syntax element to signal the process of color bit depth scalability, which if it is equal to one specifies that the color bit depth prediction process is invoked in the inter-layer prediction, and otherwise specifies that no process of color bit depth prediction is invoked;
- a second syntax element to specify the approach for color bit depth inter-layer prediction, which if it is equal to zero specifies that the operation of bit-shift is utilized as the color bit depth inter-layer prediction, and otherwise advanced color bit depth prediction is utilized as the color bit depth inter-layer prediction.

2. The method as claimed in claim 1, wherein each picture has two access units, one for the base layer and the other one for the enhancement layer.

3. The method as claimed in claim 1, wherein coded bitstreams are multiplexed to form a scalable bitstream.

4. The method as claimed in claim 1, wherein a default mode according to the first indication is that no process of color bit depth prediction is invoked.

5. The method as claimed in claim 1, wherein a default mode according to the second indication is that operation of bit-shift is utilized.

* * * * *